(12) United States Patent
Fujii et al.

(10) Patent No.: US 9,502,178 B2
(45) Date of Patent: Nov. 22, 2016

(54) MONOLITHIC CAPACITOR

(71) Applicant: Murata Manufacturing Co., Ltd., Nagaokakyo-shi, Kyoto-fu (JP)

(72) Inventors: Yasuo Fujii, Nagaokakyo (JP); Yoshinao Nishioka, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 608 days.

(21) Appl. No.: 13/914,957

(22) Filed: Jun. 11, 2013

(65) Prior Publication Data

US 2014/0153155 A1 Jun. 5, 2014

(30) Foreign Application Priority Data

Jun. 12, 2012 (JP) ................................. 2012-133215

(51) Int. Cl.
  *H01G 4/30* (2006.01)
  *H01G 4/228* (2006.01)
  *H01G 4/005* (2006.01)
  *H01G 4/01* (2006.01)
  *H01G 4/012* (2006.01)

(52) U.S. Cl.
  CPC .............. *H01G 4/01* (2013.01); *H01G 4/012* (2013.01); *H01G 4/302* (2013.01)

(58) Field of Classification Search
  USPC .................................. 361/301.4, 303, 306.3
  See application file for complete search history.

(56) References Cited

U.S. PATENT DOCUMENTS 3,612,963 A * 10/1971 Piper ..................... H01G 4/2325
  29/25.42
4,661,884 A  4/1987 Seaman
6,331,930 B1 * 12/2001 Kuroda ................... H01G 4/012
  361/303
6,950,300 B2 * 9/2005 Sutardja ................. H01G 4/232
  361/306.3
8,947,850 B2 * 2/2015 Togashi .................... H01G 4/30
  361/301.3
2002/0007908 A1  1/2002 Mamada
(Continued)

FOREIGN PATENT DOCUMENTS

CN  102082025 A  6/2011
JP  02155209 A * 6/1990
(Continued)

OTHER PUBLICATIONS

Official Communication issued in corresponding Chinese Patent Application No. 201310227286.2, mailed on Oct. 8, 2015.
(Continued)

*Primary Examiner* — Eric Thomas
(74) *Attorney, Agent, or Firm* — Keating & Bennett, LLP

(57) ABSTRACT

A monolithic capacitor includes a laminated body including stacked dielectric layers and substantially in the shape of a rectangular parallelepiped, and including a first surface being a mounting surface, a second surface opposite to the first surface, opposing third and fourth surfaces orthogonal to the first and second surfaces, and opposing fifth and sixth surfaces orthogonal to the first to fourth surfaces; capacitor electrodes disposed in the laminated body and each including a capacitive portion and a lead portion extending therefrom to at least one surface of the laminated body, the capacitive portions facing each other with dielectric layers interposed therebetween; and first and second outer electrodes disposed on at least one surface of the laminated body and connected to the lead portions. A gap between the first surface and the capacitive portions is greater than a gap between the second surface and the capacitive portions.

13 Claims, 13 Drawing Sheets

(56) References Cited

U.S. PATENT DOCUMENTS

| | | | | |
|---|---|---|---|---|
| 2006/0264317 A1* | 11/2006 | Banno | ............ | B32B 18/00 |
| | | | | 501/138 |
| 2009/0272569 A1 | 11/2009 | Wischnat | | |
| 2010/0246091 A1 | 9/2010 | Komuro et al. | | |
| 2011/0204215 A1 | 8/2011 | Yoshida et al. | | |
| 2012/0300361 A1* | 11/2012 | Togashi | ............ | H01G 4/30 |
| | | | | 361/301.4 |
| 2013/0038979 A1 | 2/2013 | Togashi | | |
| 2013/0321981 A1* | 12/2013 | Ahn | ............ | H01G 4/30 |
| | | | | 361/321.2 |
| 2014/0168849 A1* | 6/2014 | Lee | ............ | H01G 4/30 |
| | | | | 361/301.4 |

FOREIGN PATENT DOCUMENTS

| | | | |
|---|---|---|---|
| JP | 2-125323 U | | 10/1990 |
| JP | 6-84687 A | | 3/1994 |
| JP | 6-215978 A | | 8/1994 |
| JP | 8-55758 A | | 2/1996 |
| JP | 8-130160 A | | 5/1996 |
| JP | 8-236387 A | | 9/1996 |
| JP | 9-260184 A | | 10/1997 |
| JP | 11-340106 A | | 12/1999 |
| JP | 2000-232030 A | | 8/2000 |
| JP | 2004179436 A | * | 6/2004 |
| JP | 2010-510644 A | | 4/2010 |
| JP | 2011-175133 A | | 9/2011 |
| JP | 2011-249750 A | | 12/2011 |
| JP | 2013-38332 A | | 2/2013 |

OTHER PUBLICATIONS

Official Communication issued in corresponding Japanese Patent Application No. 2013-054027, mailed on Jun. 23, 2015.
Official Communication issued in corresponding Japanese Patent Application No. 2013-054027, mailed on Aug. 25, 2015.

* cited by examiner

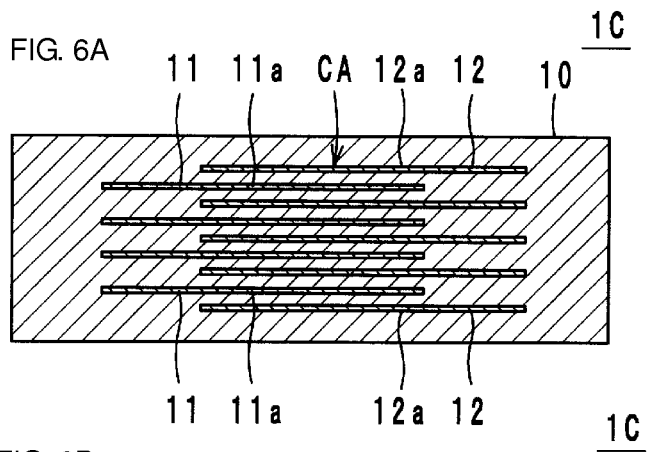
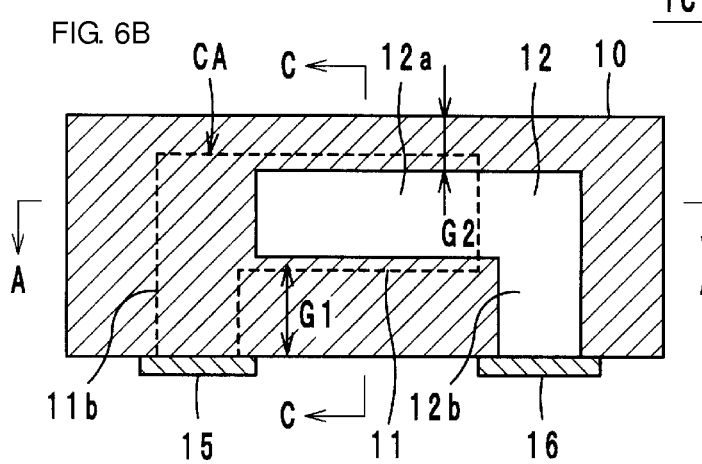
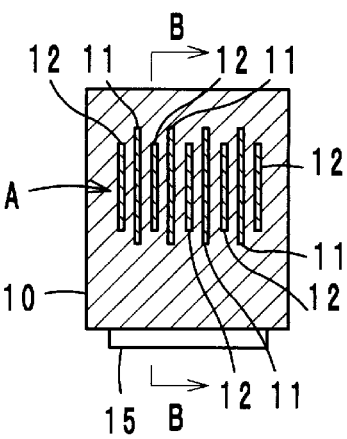
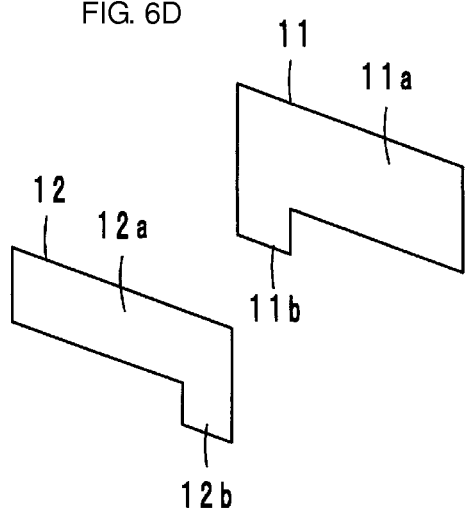

MONOLITHIC CAPACITOR

BACKGROUND OF THE INVENTION

1. Field of the Invention

The present invention relates to monolithic capacitors. In particular, the present invention relates to a monolithic capacitor that includes a laminated body including a plurality of dielectric layers stacked on each other; a plurality of capacitor electrodes disposed in the laminated body to face each other, with each of the dielectric layers interposed between adjacent ones of the capacitor electrodes; and a plurality of outer electrodes disposed on the surface of the laminated body and connected to the capacitor electrodes.

2. Description of the Related Art

In a monolithic capacitor formed by alternately stacking dielectric layers and capacitor electrodes, the application of a voltage thereto causes electrostriction in capacitive portions and expansion and contraction of a laminated body. In recent years, as monolithic capacitors have become smaller and their layers have become thinner, the intensity of an electric field applied to the dielectric body has increased and the resulting electrostriction has become difficult to ignore. When a voltage including ripples, i.e., an alternating (AC) voltage, or a direct (DC) voltage having an alternating-current component superimposed thereon is applied to a monolithic capacitor mounted (or soldered) on a substrate, the expansion and contraction of a laminated body propagates to the substrate and causes the substrate to vibrate. The resulting noise is perceived by the human ear when the frequency is in the audible range of about 20 Hz to about 20 kHz. This noise, which may be referred to as "acoustic noise", causes problems in television sets, notebook computers, and cellular phones.

Various techniques have been proposed to prevent or reduce such "acoustic noise". For example, Japanese Unexamined Patent Application Publication No. 2000-232030 proposes a technique in which ceramic capacitors having the same specifications are disposed on the respective front and back surfaces of a circuit board such that they are plane-symmetric with respect to the circuit board. In this technique, a vibration transmitted from one capacitor to the circuit board and a vibration transmitted from the other capacitor to the circuit board cancel out each other to reduce audible sound.

However, the technique described in Japanese Unexamined Patent Application Publication No. 2000-232030 requires two capacitors of the same specifications to be mounted on the front and back surfaces of the circuit board. This restricts the degree of freedom in circuit design.

SUMMARY OF THE INVENTION

Preferred embodiments of the present invention provide a monolithic capacitor that significantly reduces acoustic noise while also providing a high degree of freedom in circuit design.

A monolithic capacitor according to preferred embodiments of the present invention includes a laminated body including a plurality of dielectric layers stacked on each other and substantially in the shape of a rectangular parallelepiped having six surfaces, the laminated body including a first surface serving as a mounting surface, a second surface opposite to the first surface, a third surface and a fourth surface orthogonal to the first surface and the second surface and opposite each other, and a fifth surface and a sixth surface orthogonal to the first surface to the fourth surface and opposite each other; a plurality of capacitor electrodes disposed in the laminated body, the capacitor electrodes each including a capacitive portion and a lead portion extending outward from the capacitive portion to at least one of the surfaces of the laminated body, the capacitive portions facing each other with each of the dielectric layers interposed between adjacent ones of the capacitive portions; and a first outer electrode and a second outer electrode disposed on at least one of the surfaces of the laminated body and connected to the lead portions. In the monolithic capacitor, the inequality $G1>G2$ is satisfied, where $G1$ is a gap dimension between the first surface and the capacitive portions and $G2$ is a gap dimension between the second surface and the capacitive portions.

In the monolithic capacitor, the gap dimension $G1$ between the first surface and the capacitive portions is greater than the gap dimension $G2$ between the second surface and the capacitive portions. Therefore, the expansion and contraction of the laminated body caused by electrostriction that occurs in the capacitive portions where the capacitor electrodes face each other is not easily transmitted to a substrate on which the monolithic capacitor is mounted. It is thus possible to reduce acoustic noise.

In preferred embodiments of the present invention, the transmission of expansion and contraction of the laminated body to the substrate can be reduced through only one monolithic capacitor. It is thus possible to reduce acoustic noise while also providing a high degree of freedom in circuit design.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 2A is a cross-sectional view taken along line A-A of FIG. 2B, FIG. 2B is a cross-sectional view taken along line B-B of FIG. 2A, and FIG. 2C is a perspective view of capacitor electrodes.

FIG. 4A is a cross-sectional view taken along line A-A of FIG. 4B, FIG. 4B is a cross-sectional view taken along line B-B of FIG. 4A, and FIG. 4C is a perspective view of capacitor electrodes.

FIGS. 6A to 6D illustrate a monolithic capacitor according to a third preferred embodiment of the present invention, and specifically, FIG. 6A is a cross-sectional view taken along line A-A of FIG. 6B, FIG. 6B is a cross-sectional view taken along line B-B of FIG. 6C, FIG. 6C is a cross-sectional view taken along line C-C of FIG. 6B, and FIG. 6D is a perspective view of capacitor electrodes.

FIG. 7A is a cross-sectional view taken along line A-A of FIG. 7B, FIG. 7B is a cross-sectional view taken along line B-B of FIG. 7A, and FIG. 7C is a cross-sectional view taken along line C-C of FIG. 7B.

FIG. 8A is a cross-sectional view taken along line A-A of FIG. 8B, FIG. 8B is a cross-sectional view taken along line B-B of FIG. 8A and illustrating a mounted state of the monolithic capacitor, and FIG. 8C is a cross-sectional view taken along line C-C of FIG. 8B.

FIG. 9A is a cross-sectional view taken along line A-A of FIG. 9B, FIG. 9B is a cross-sectional view taken along line B-B of FIG. 9A and illustrating a mounted state of the monolithic capacitor, and FIG. 9C is a cross-sectional view taken along line C-C of FIG. 9B.

FIG. 10A is a cross-sectional view taken along line A-A of FIG. 10B, FIG. 10B is a cross-sectional view taken along line B-B of FIG. 10A and illustrating a mounted state of the monolithic capacitor, and FIG. 10C is a cross-sectional view taken along line C-C of FIG. 10B.

FIG. 12A is a cross-sectional view taken along line A-A of FIG. 12B, FIG. 12B is a cross-sectional view taken along line B-B of FIG. 12A and illustrating a mounted state of the monolithic capacitor, and FIG. 12C is a cross-sectional view taken along line C-C of FIG. 12B.

DETAILED DESCRIPTION OF THE PREFERRED EMBODIMENTS

Figure 1:
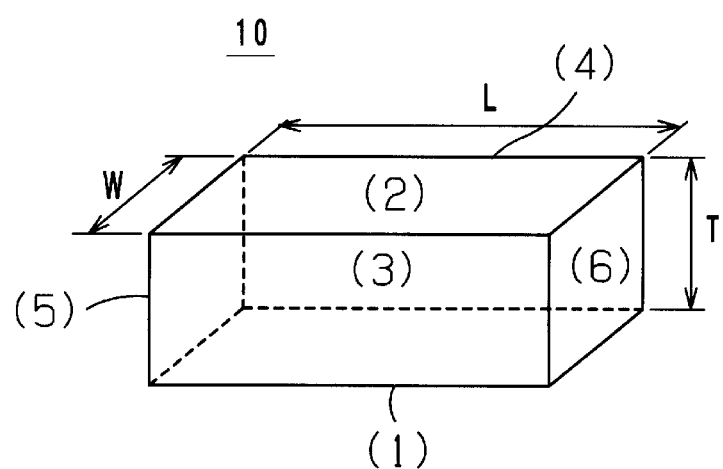
FIG. 1 is a perspective view illustrating a laminated body of a monolithic capacitor according to a preferred embodiment of the present invention.
Figure 2A:
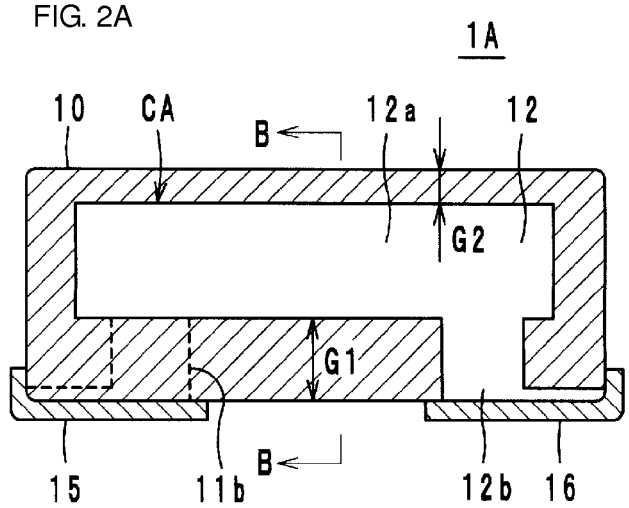
FIGS. 2A to 2C illustrate a monolithic capacitor according to a first preferred embodiment of the present invention, and specifically.
Figure 2B:
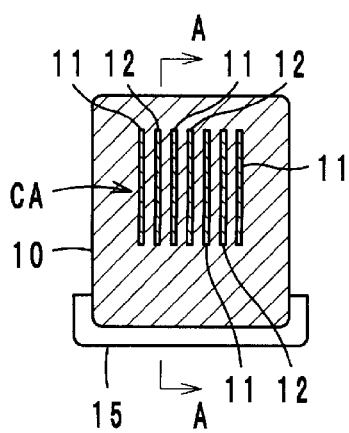
Figure 2C:
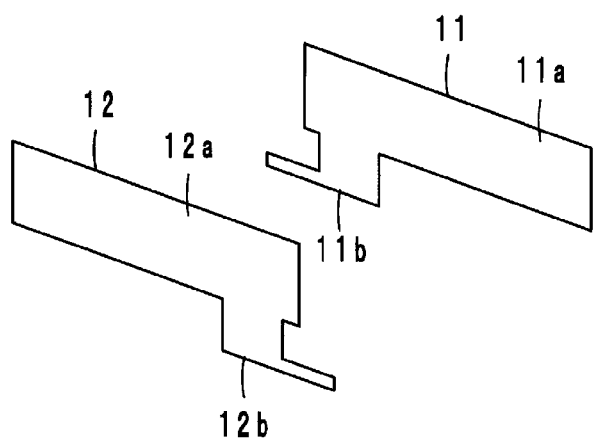

Preferred embodiments of a monolithic capacitor according to the present invention will now be described with reference to the accompanying drawings. Throughout the drawings, the same components and elements are denoted by the same reference numerals, and redundant description will be omitted.

As illustrated in FIG. 1, a laminated body 10 included in a monolithic capacitor in accordance with a preferred embodiment of the present invention preferably in or substantially in the shape of a rectangular parallelepiped having six surfaces. The laminated body 10 is defined by stacking a plurality of dielectric layers. In the present preferred embodiment, a mounting surface (lower surface) is defined as a first surface (1); an upper surface opposite to the first surface is defined as a second surface (2); a front side and a back side orthogonal to both the first surface (1) and the second surface (2) and opposite each other are defined as a third surface (3) and a fourth surface (4), respectively; and a left side and a right side orthogonal to the first surface (1) to the fourth surface (4) and opposite each other are defined as a fifth surface (5) and a sixth surface (6), respectively.

A dimension between the first surface (1) and the second surface (2) is denoted by T, a dimension between the third surface (3) and the fourth surface (4) is denoted by W, and a dimension between the fifth surface (5) and the sixth surface (6) is denoted by L. The dimensions described herein include the thickness of outer electrodes.

A monolithic capacitor 1A according to a first preferred embodiment of the present invention preferably includes the laminated body 10; a plurality of first and second capacitor electrodes 11 and 12 alternately arranged in the laminated body 10 to face each other, with each of the dielectric layers interposed between adjacent ones of the first and second capacitor electrodes 11 and 12; and first and second outer electrodes 15 and 16. The monolithic capacitor 1A is preferably manufactured by a known lamination process. The capacitor electrodes 11 and 12 are preferably perpendicular or substantially perpendicular to the first surface and the second surface. The first outer electrode 15 is defined on the first surface and a portion (lower portion) of the fifth surface, and the second outer electrode 16 is defined on the first surface and a portion (lower portion) of the sixth surface. The first and second outer electrodes 15 and 16 on the fifth surface and the sixth surface, respectively, are preferably smaller than a gap dimension G1 between the first surface and capacitive portions 11a and 12a (described below).

The first and second capacitor electrodes 11 and 12 include the capacitive portions 11a and 12a and lead portions 11b and 12b, respectively. The capacitive portions 11a and 12a face each other. The lead portion 11b of each of the first capacitor electrodes 11 preferably extends outward from the capacitive portion 11a to the first surface and the fifth surface of the laminated body 10, and connects to the first outer electrode 15. Similarly, the lead portion 12b of each of the second capacitor electrodes 12 preferably extends outward from the capacitive portion 12a to the first surface and the sixth surface of the laminated body 10, and connects to the second outer electrode 16. A region where the capacitive portions 11a and 12a face each other, with each of the dielectric layers interposed between adjacent ones of the capacitive portions 11a and 12a, serves as a capacitive region CA.

The monolithic capacitor 1A is preferably configured to satisfy the relationship G1>G2, where G1 is a gap dimension between the first surface and the capacitive portions 11a and 12a, and G2 is a gap dimension between the second surface and the capacitive portions 11a and 12a. It is preferable that a value obtained by subtracting G2 from G1 (G1−G2) be at least about 10 μm, for example.

More specifically, the height dimension T and the width dimension W preferably satisfy the relationship T>W, and the length dimension L and the width dimension W preferably satisfy the relationship L>W. The corners and ridges of the laminated body 10 are preferably rounded.

The dielectric layers may be preferably made of a dielectric ceramic mainly composed of $BaTiO_3$, $CaTiO_3$, $SrTiO_3$, or $CaZrO_3$, for example. An accessory component, such as, for example, an Mn compound, an Mg compound, an Si compound, a Co compound, an Ni compound, or a rare earth compound, may be added to such a main component. The thickness of each dielectric layer in the capacitive region CA is preferably about 0.5 μm to about 10 μm, for example.

The first and second capacitor electrodes 11 and 12 may be preferably made of, for example, Ni, Cu, Ag, Pd, Ag—Pd alloy, or Au, and are preferably about 0.3 μm to about 2.0 μm in thickness, for example.

The outer electrodes 15 and 16 are each preferably defined by a foundation layer and a plating layer on the foundation layer. The foundation layer may be preferably made of, for example, Cu, Ni, Ag, Pd, Ag—Pd alloy, or Au, and defined by baking a conductive paste. The foundation layer may be directly formed by plating on the surface of the laminated body 10. The plating layer may be preferably made of, for example, Cu, Ni, Ag, Pd, Ag—Pd alloy, or Au, and may be defined by a plurality of layers. Preferably, the plating layer has a two-layer structure of an Ni plating layer and an Sn plating layer. The outer electrodes 15 and 16 each may include a conductive resin layer.

Figure 3:
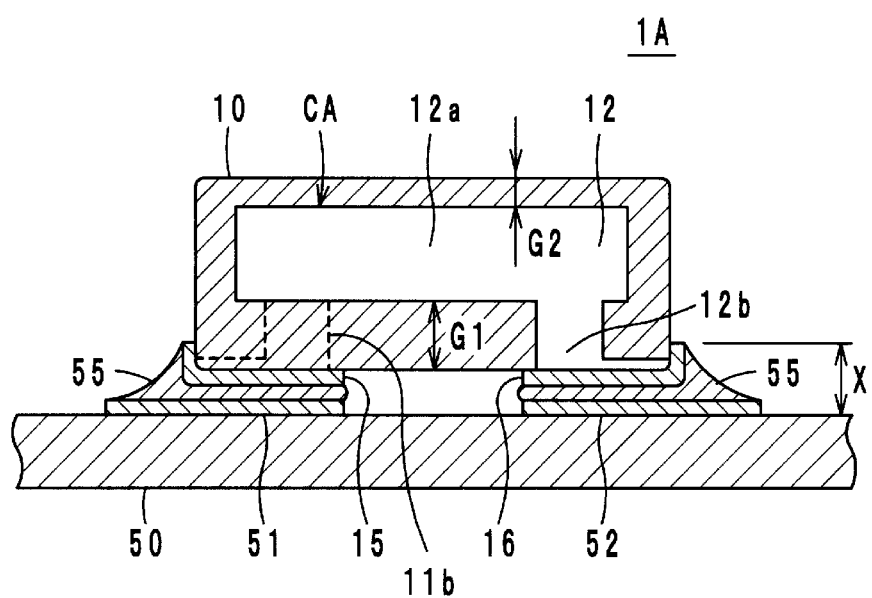
FIG. 3 is a cross-sectional view illustrating the monolithic capacitor of the first preferred embodiment of the present invention mounted on a circuit board.

As illustrated in FIG. 3, the monolithic capacitor 1A having the configuration described above is preferably mounted on a printed circuit board 50. A glass epoxy substrate is preferably used as the printed circuit board 50. A circuit (not shown) for the monolithic capacitor 1A is preferably defined on the printed circuit board 50.

The monolithic capacitor 1A is mounted on first and second lands 51 and 52 on the printed circuit board 50, with solder 55 interposed therebetween. Specifically, by heating solder paste applied onto the lands 51 and 52 in a reflow oven, the solder paste spreads and allows the lands 51 and 52 to be joined to the outer electrodes 15 and 16, respectively. The monolithic capacitor 1A is mounted such that the capacitor electrodes 11 and 12 are preferably perpendicular or substantially perpendicular to the surface of the printed circuit board 50. The solder paste may preferably be, for example, an Sn—Pb eutectic solder paste or a lead-free solder paste, such as an Sn—Ag—Cu solder paste. A conductive adhesive may be used instead of solder, if so desired.

In the monolithic capacitor 1A, the gap dimension G1 between the first surface and the capacitive portions 11a and 12a is preferably greater than the gap dimension G2 between the second surface and the capacitive portions 11a and 12a. Therefore, the expansion and contraction of the laminated body 10 caused by electrostriction that occurs in the capacitive portions 11a and 12a where the capacitor electrodes 11 and 12 face each other is not easily transmitted to the printed circuit board 50. It is thus possible to reduce acoustic noise. Hereinafter, a description will be given of a test that was performed to verify the effect described above.

Twelve types of monolithic capacitors 1A (samples 1 to 12) structured as described above were prepared in the sizes shown in Table 1.

Material of capacitor electrode: Ni
Thickness of capacitor electrode: About 0.58 μm
Number of capacitor electrodes: About 498
Material of outer electrode: Cu/Ni/Sn (defined by plating)
Thickness of outer electrode: About 13 μm
Gap dimension between surface of circuit board and outer electrode: About 50 μm
Height of outer electrode: Fillet height X−50 μm (fillet height X includes gap dimension 50 μm)
Fillet height X: As in Table 1
Gap dimension G1: As in Table 1
Gap dimension G2: As in Table 1

The dimensions of each of samples 1 to 12 were measured in the following manner. The length dimension L is the average of measured lengths of about 20 capacitors, the lengths each being a distance between central portions of the fifth surface and the sixth surface. The width dimension W is the average of measured widths of about 20 capacitors, the widths each being a distance between central portions of the third surface and the fourth surface. The height dimension T is the average of measured heights of about 20 capacitors, the heights each being a distance between the first surface and the second surface in the region where there is an outer electrode. These dimensions were obtained by measuring, with a micrometer, capacitors from the same production lot as those for which sound pressure levels (described below) were to be measured.

The fillet height X is the average of average values of about three capacitors, the average values each being the average of the measured distance between the surface of the printed circuit board 50 and the top of the fillet in the first outer electrode 15 and the measured distance between the surface of the printed circuit board 50 and the top of the fillet in the second outer electrode 16. Each fillet height was measured by observing, with a metallurgical microscope, a cross section of a central portion of the capacitor in the width direction, the cross section being exposed by grinding the third surface of the capacitor after measurement of the sound pressure level (described below).

For each of samples 1 to 12, about three additional capacitors were taken from the same production lot as those for which sound pressure levels (described below) were to

TABLE 1

| | Dimension L (mm) | Dimension W (mm) | Dimension T (mm) | Fillet Height X (mm) | Gap Dimension G1 (μm) | Gap Dimension G2 (μm) | Sound Pressure (dB) |
|---|---|---|---|---|---|---|---|
| Sample 1 | 1.65 | 0.87 | 0.92 | 0.1 | 84 | 84 | 80.6 |
| Sample 2 | 1.65 | 0.87 | 1.12 | 0.1 | 284 | 84 | 72.3 |
| Sample 3 | 1.65 | 0.87 | 1.42 | 0.1 | 584 | 84 | 39.1 |
| Sample 4 | 1.65 | 0.87 | 0.92 | 0.15 | 84 | 84 | 81.0 |
| Sample 5 | 1.65 | 0.87 | 1.12 | 0.15 | 284 | 84 | 73.2 |
| Sample 6 | 1.65 | 0.87 | 1.42 | 0.15 | 584 | 84 | 48.6 |
| Sample 7 | 1.65 | 0.87 | 0.92 | 0.25 | 84 | 84 | 81.6 |
| Sample 8 | 1.65 | 0.87 | 1.12 | 0.25 | 284 | 84 | 74.5 |
| Sample 9 | 1.65 | 0.87 | 1.42 | 0.25 | 584 | 84 | 56.1 |
| Sample 10 | 1.65 | 0.87 | 0.92 | 0.55 | 84 | 84 | 81.9 |
| Sample 11 | 1.65 | 0.87 | 1.12 | 0.55 | 284 | 84 | 75.9 |
| Sample 12 | 1.65 | 0.87 | 1.42 | 0.55 | 584 | 84 | 61.3 |

The sizes of each sample are as follows.
Outer dimensions of laminated body: As in Table 1
Capacitance: About 22 μF
Material of dielectric body: Ceramic mainly composed of $BaTiO_3$
Thickness of dielectric layer between capacitive portions: About 0.94 μm be measured. Then, for each of the capacitors taken, a cross section of a central portion in the length direction was exposed by grinding the fifth surface of the capacitor.

For the gap dimension G1, a gap dimension G1a between the first surface and the capacitive portion 11a of the first capacitor electrode 11 and a gap dimension G1b between the first surface and the capacitive portion 12a of the second capacitor electrode 12 were measured, and the larger of the gap dimensions G1a and G1b was defined as G1. For the gap dimension G2, a gap dimension G2a between the second surface and the capacitive portion 11a of the first capacitor electrode 11 and a gap dimension G2b between the second surface and the capacitive portion 12a of the second capacitor electrode 12 were measured, and the larger of the gap dimensions G2a and G2b was defined as G2.

For measurement of the gap dimensions G1a and G1b, the gap dimensions between the first surface and the first and second capacitor electrodes 11 and 12 were measured at three different points (at the leftmost layer, the central layer, and the rightmost layer) in the width direction, and their averages were used. Similarly, for measurement of the gap dimensions G2a and G2b, the gap dimensions between the second surface and the first and second capacitor electrodes 11 and 12 were measured at three different points (i.e., at the leftmost layer, the central layer, and the rightmost layer) in the width directions, and their averages were used. Then, the average of gap dimensions G1 and the average of gap dimensions G2 of three capacitors were obtained to determine the gap dimensions G1 and G2 of each of samples 1 to 12. Note that if the total number of the first and second capacitor electrodes 11 and 12 was an even number, a layer closest to the center was used as the central layer.

Figure 13:
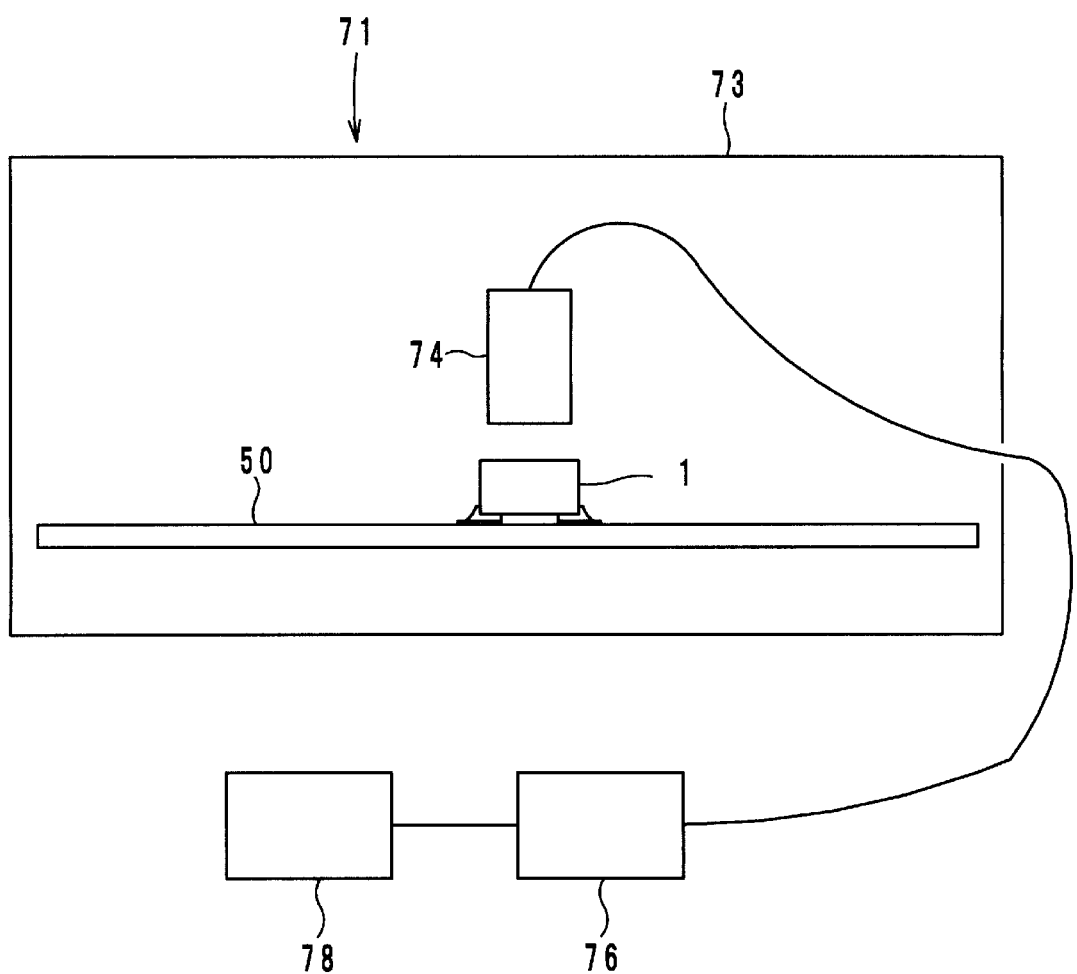
FIG. 13 illustrates a configuration of a measuring apparatus that measures sound pressure levels in accordance with a preferred embodiment of the present invention.

The sound pressure levels of three capacitors were measured for each of samples 1 to 12, and their average was used as the sound pressure. FIG. 13 illustrates a measuring apparatus 71 that measures sound pressure levels that was used in accordance with a preferred embodiment of the present invention. Each of samples 1 to 12 was placed in an anechoic box 73, and an alternating voltage having a frequency of about 2.9 kHz and a voltage of about 1 Vpp was applied to the sample (capacitor 1). Then, the resulting acoustic noise was collected by a sound collecting microphone 74, and the sound pressure level of the collected sound was measured by a sound level meter 76 and a fast Fourier transform (FFT) analyzer 78 (in this preferred embodiment, a CF-5220 by Ono Sokki Co., Ltd. was used). The sound collecting microphone 74 was spaced about 3 mm from the printed circuit board 50. The printed circuit board 50 measures about 100 mm by about 40 mm and is about 1.6 mm in thickness. The printed circuit board 50 resonates at a frequency of about 2.9 kHz.

The test result is shown as sound pressure (dB) in Table 1. It was confirmed that the larger the gap dimension G1 was than that of samples 1, 4, 7, and 10 where G1 and G2 were set to be equal (i.e., G1=G2), the lower the level of acoustic noise. It is preferable that a value obtained by subtracting G2 from G1 (i.e., G1−G2) be at least about 10 µm, for example.

The height dimension of the first and second outer electrodes 15 and 16 is preferably smaller than the gap dimension G1 between the first surface and the capacitive portions 11a and 12a. In this case, as viewed from the fifth surface or the sixth surface, no fillet is formed in the capacitive region CA where the laminated body 10 expands and contracts significantly. Thus, since the transmission of vibration is reduced, the level of acoustic noise can be reduced.

In the following description, the test for verifying the sound pressure reduction effect is described only for the first and eighth preferred embodiments. However, it is easy for those skilled in the art to additionally perform a similar test for other preferred embodiments.

Figure 4A:
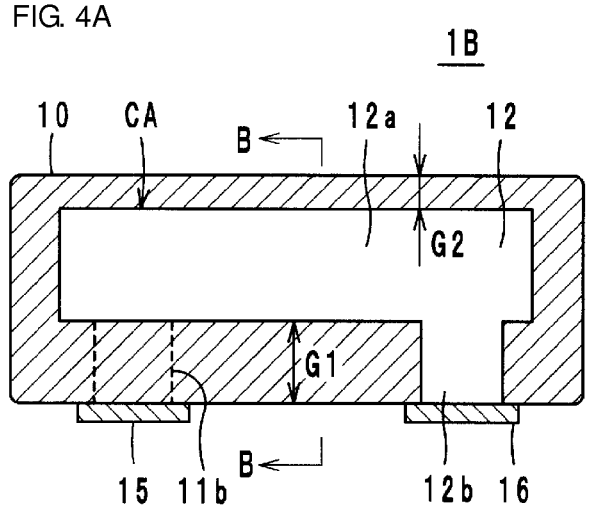
FIGS. 4A to 4C illustrate a monolithic capacitor according to a second preferred embodiment of the present invention, and specifically.
Figure 4B:
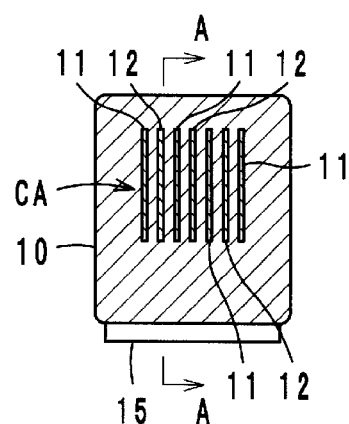
Figure 4C:
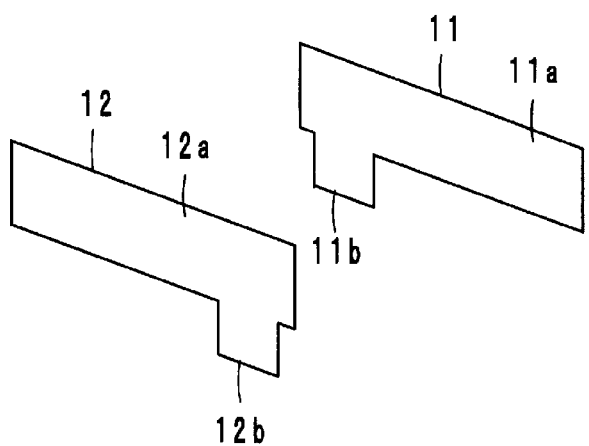
Figure 5:
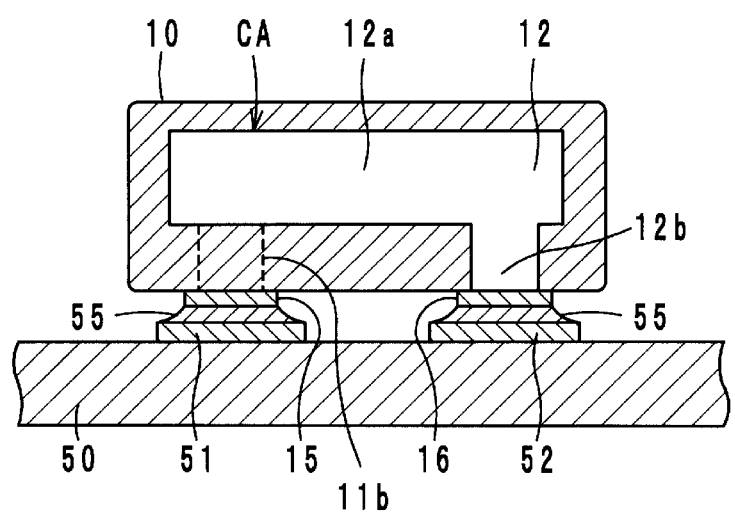
FIG. 5 is a cross-sectional view illustrating the monolithic capacitor of the second preferred embodiment of the present invention mounted on a circuit board.

FIGS. 4A to 4C illustrate a monolithic capacitor 1B according to a second preferred embodiment of the present invention. As illustrated, the lead portions 11b and 12b of the first and second capacitor electrodes 11 and 12 extend outward only to the first surface of the laminated body 10, and the first and second outer electrodes 15 and 16 are provided only on the first surface of the laminated body 10. FIG. 5 illustrates a mounted state of the monolithic capacitor 1B. The first and second outer electrodes 15 and 16 are connected to the first and second lands 51 and 52, respectively, with the solder 55 interposed therebetween. Since the first and second outer electrodes 15 and 16 are arranged only on the first surface, the solder 55 is less likely to spread to the fifth surface and the sixth surface (filletless). In the monolithic capacitor 1B of the second preferred embodiment, the vibration of the laminated body 10 is not easily transmitted to the printed circuit board 50. Therefore, the level of acoustic noise can be lower than that in the monolithic capacitor 1A of the first preferred embodiment.

The monolithic capacitor 1B also preferably has the gap dimension G1 greater than the gap dimension G2, and the resulting effect is the same as that described in the first preferred embodiment.

FIGS. 6A to 6D illustrate a monolithic capacitor 1C according to a third preferred embodiment of the present invention. As illustrated, the height dimension of the first capacitor electrodes 11 in the capacitive portions 11a is greater than the height dimension of the second capacitor electrodes 12 in the capacitive portions 12a, and the capacitive portions 11a and 12a are made short so as not to overlap with the lead portions 12b and 11b, respectively. The third preferred embodiment is preferably the same as the second preferred embodiment in that the lead portions 11b and 12b extend outward only to the first surface of the laminated body 10, and that the first and second outer electrodes 15 and 16 are provided only on the first surface of the laminated body 10. Also, the monolithic capacitor 1C is mounted on the printed circuit board 50 in the same manner as in the second preferred embodiment.

The monolithic capacitor 1C also preferably includes the gap dimension G1 greater than the gap dimension G2, and the resulting effect is the same as that described in the first preferred embodiment. Particularly in the third preferred embodiment, where there is a difference in height dimension between the capacitive portions 11a and 12a, even if, for example, a stacking deviation occurs in the first capacitor electrodes 11 or the second capacitor electrodes 12 during manufacture of the laminated body 10, the area where the capacitive portions 11a and 12a face each other (i.e., a portion in which a capacitance between the capacitive portions 11a and 12a is provided) does not change.

As viewed from the third surface, a region where the capacitive portions 11a of the first capacitor electrodes 11 do not overlap with the capacitive portions 12a of the second capacitor electrodes 12 is preferably provided at least on a side adjacent to the first surface (mounting surface). A difference in thickness between a region where the first and second capacitor electrodes 11 and 12 overlap and a region where the first and second capacitor electrodes 11 and 12 are not present causes significant unevenness in the body shape of the laminated body 10. This may affect the positional stability of the mounted monolithic capacitor. In particular, if the height dimension T is greater than the width dimension W (T>W), the positional instability of the mounted monolithic capacitor increases. However, if a region where, in the lamination direction, the first capacitor electrodes 11 do not overlap with the second capacitor electrodes 12 is provided on the side adjacent to the mounting surface, it is possible to reduce the unevenness and stabilize the position of the mounted monolithic capacitor even in the case when T>W.

For increased capacitance, it is preferable that, on the side adjacent to the mounting surface, there be a region where the first capacitor electrodes 11 do not overlap with the second capacitor electrodes 12 in the lamination direction and that, on the side remote from the mounting surface (i.e., on the second surface side), edges of the first and second capacitor electrodes 11 and 12 be substantially aligned in the height direction.

Figure 7A:
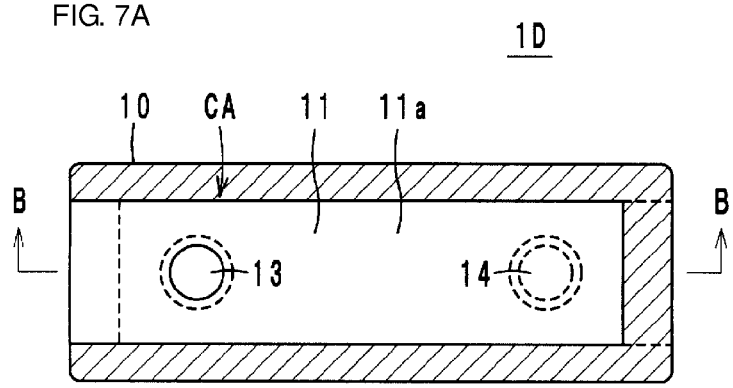
FIGS. 7A to 7C illustrate a monolithic capacitor according to a fourth preferred embodiment of the present invention, and specifically.
Figure 7B:
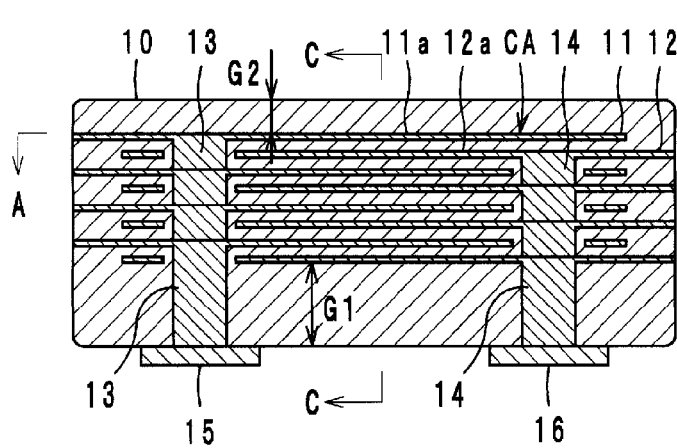
Figure 7C:
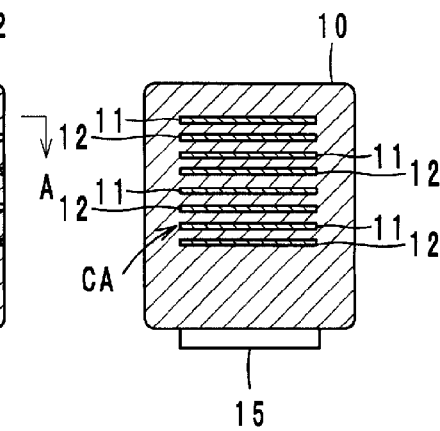

FIGS. 7A to 7C illustrate a monolithic capacitor 1D according to a fourth preferred embodiment of the present invention. As illustrated, the first and second capacitor electrodes 11 and 12 are horizontal to the first surface and the second surface of the laminated body 10. The first capacitor electrodes 11 are preferably connected to each other through a via hole conductor 13, which serves as a lead portion and connects to the first outer electrode 15. Similarly, the second capacitor electrodes 12 are preferably connected to each other through a via hole conductor 14, which serves as a lead portion and connects to the second outer electrode 16. The fourth preferred embodiment is the same as the second preferred embodiment in that the first and second outer electrodes 15 and 16 are provided only on the first surface of the laminated body 10. Also, the monolithic capacitor 1D is mounted on the printed circuit board 50 in the same manner as in the second preferred embodiment.

The monolithic capacitor 1D also preferably has the gap dimension G1 greater than the gap dimension G2, and the resulting effect is the same as that described in the first preferred embodiment. As compared to the case where the first and second capacitor electrodes 11 and 12 are perpendicular or substantially perpendicular to the first surface and the second surface of the laminated body 10, when the first and second capacitor electrodes 11 and 12 are horizontal to the first surface and the second surface of the laminated body 10 as in the fourth preferred embodiment, the deformation of the first surface of the laminated body 10 is smaller and the acoustic noise can be reduced.

In the monolithic capacitor 1D, as in the first preferred embodiment of the present invention, the first outer electrode 15 may be arranged on the first surface and a portion (lower portion) of the fifth surface, and the second outer electrode 16 may be arranged on the first surface and a portion (lower portion) of the sixth surface. In this case, the first and second outer electrodes 15 and 16 on the fifth surface and the sixth surface, respectively, are preferably smaller than the gap dimension G1 between the first surface and the capacitor electrode 11 or 12 closest to the first surface.

Figure 8A:
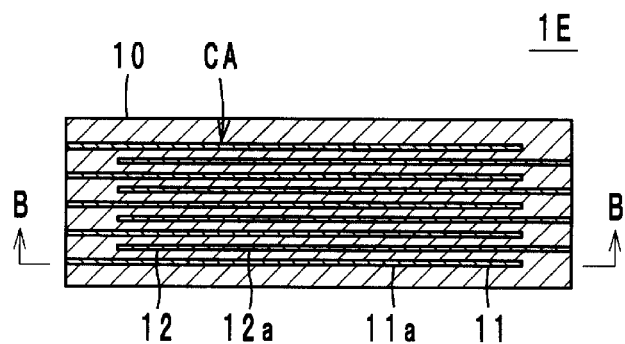
FIGS. 8A to 8C illustrate a monolithic capacitor according to a fifth preferred embodiment of the present invention, and specifically.
Figure 8B:
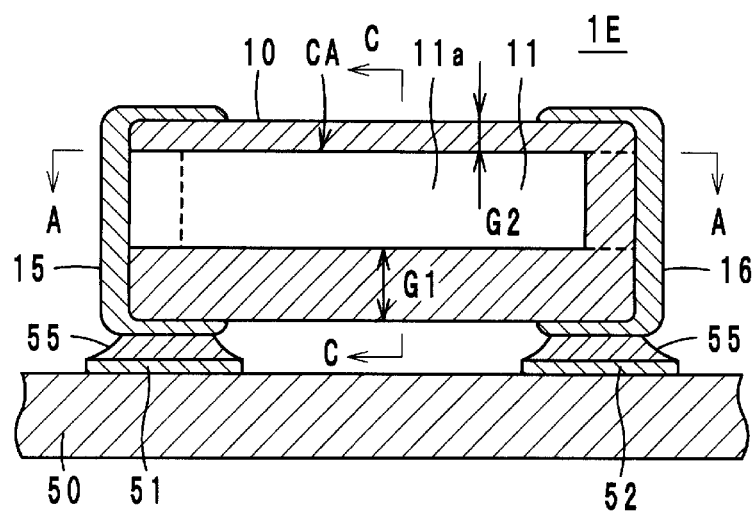
Figure 8C:
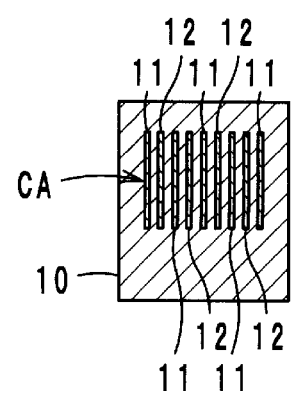

FIGS. 8A to 8C illustrate a monolithic capacitor 1E according to a fifth preferred embodiment of the present invention. As illustrated, the first capacitor electrodes 11 preferably extend outward to the fifth surface of the laminated body 10 to connect to the first outer electrode 15, and the second capacitor electrodes 12 extend outward to the sixth surface of the laminated body 10 to connect to the second outer electrode 16. The first outer electrode 15 is preferably arranged on the fifth surface and extends to both the first surface and the second surface, and the second outer electrode 16 is preferably arranged on the sixth surface and extends to both the first surface and the second surface. As illustrated in FIG. 8B, the monolithic capacitor 1E is preferably mounted in a filletless manner on the lands 51 and 52 on the printed circuit board 50. That is, only the first surface side of the monolithic capacitor 1E is connected to the lands 51 and 52 on the printed circuit board 50, with the solder 55 interposed therebetween. However, if desirable, the monolithic capacitor 1E may alternatively be connected to the lands 51 and 52 such that fillets are defined on the fifth surface and the sixth surface.

The monolithic capacitor 1E also preferably includes the gap dimension G1 greater than the gap dimension G2, and the resulting effect is the same as that described in the first preferred embodiment.

Figure 9A:
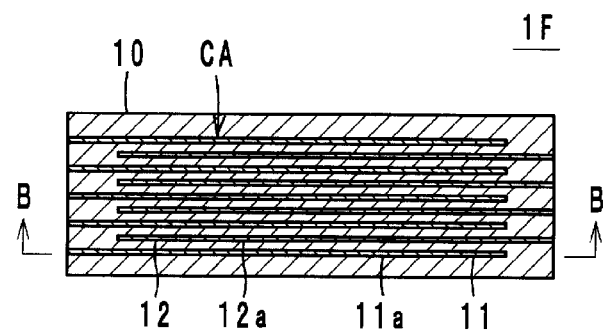
FIGS. 9A to 9C illustrate a monolithic capacitor according to a sixth preferred embodiment of the present invention, and specifically.
Figure 9B:
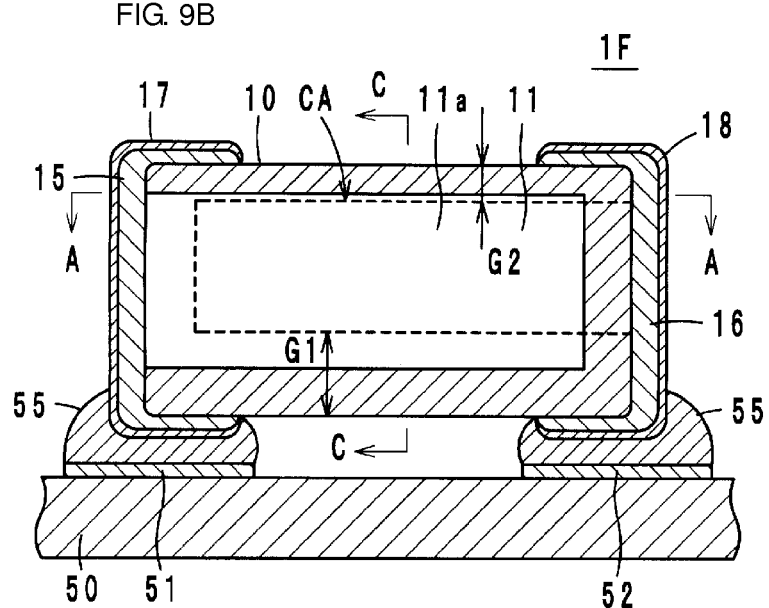
Figure 9C:
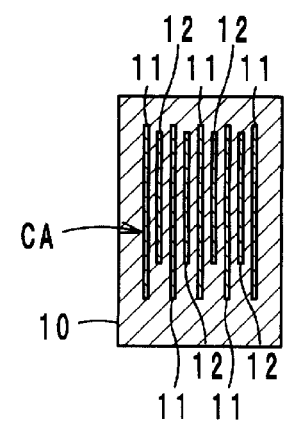

FIGS. 9A to 9C illustrate a monolithic capacitor 1F according to a sixth preferred embodiment of the present invention. As illustrated, the first capacitor electrodes 11 preferably extend outward to the fifth surface of the laminated body 10 to connect to the first outer electrode 15, and the second capacitor electrodes 12 preferably extend outward to the sixth surface of the laminated body 10 to connect to the second outer electrode 16. The first outer electrode 15 is arranged on the fifth surface and extends to both the first surface and the second surface, and the second outer electrode 16 is arranged on the sixth surface and extends to both the first surface and the second surface. Plating layers 17 and 18 are preferably disposed on the surfaces of the first and second outer electrodes 15 and 16, respectively. As illustrated in FIG. 9B, the monolithic capacitor 1F is mounted by being connected to the lands 51 and 52 on the printed circuit board 50 such that solder fillets are arranged on the fifth surface and the sixth surface. The monolithic capacitor 1F may be mounted in a filletless manner, that is, only the first surface side of the monolithic capacitor 1F may be connected to the lands 51 and 52 on the printed circuit board 50, with the solder 55 interposed therebetween.

The monolithic capacitor 1F also preferably includes the gap dimension G1 greater than the gap dimension G2, and the resulting effect is the same as that described in the first preferred embodiment. Additionally, in the sixth preferred embodiment of the present invention, the dimension of the capacitive portions 11a of the first capacitor electrodes 11 in the height direction is set to be greater than the dimension of the capacitive portions 12a of the second capacitor electrodes 12 in the height direction. Thus, even if a stacking deviation occurs in the first capacitor electrodes 11 or the second capacitor electrodes 12 during manufacture of the laminated body 10, the area where the capacitive portions 11a and 12a face each other (i.e., a capacitance between the capacitive portions 11a and 12a) does not change.

As viewed from the third surface, a region where the capacitive portions 11a of the first capacitor electrodes 11 do not overlap with the capacitive portions 12a of the second capacitor electrodes 12 is preferably provided at least on a side adjacent to the first surface (mounting surface). A difference in thickness between a region where the first and second capacitor electrodes 11 and 12 overlap and a region where the first and second capacitor electrodes 11 and 12 are not present causes significant unevenness in the body shape of the laminated body 10. This may affect the positional stability of the mounted monolithic capacitor. In particular, if the height dimension T is greater than the width dimension W (i.e., if T>W), the positional instability of the mounted monolithic capacitor increases. However, if a region where, in the lamination direction, the first capacitor electrodes 11 do not overlap with the second capacitor electrodes 12 is provided on the side adjacent to the mounting surface, it is possible to reduce the unevenness and stabilize the position of the mounted monolithic capacitor even in the case where T>W.

For increased capacitance, it is preferable that, on the side adjacent to the mounting surface, there be a region where the first capacitor electrodes 11 do not overlap with the second capacitor electrodes 12 in the lamination direction and that, on the side remote from the mounting surface (i.e., on the second surface side), edges of the first and second capacitor electrodes 11 and 12 be aligned or substantially aligned in the height direction.

Figure 10A:
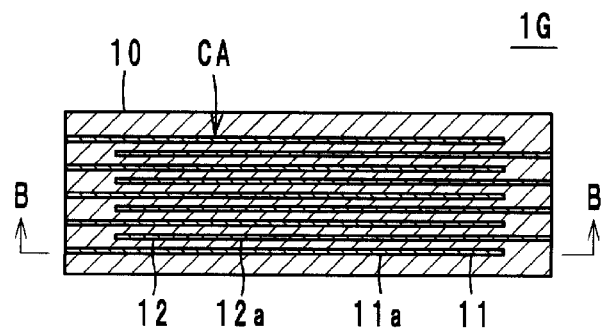
FIGS. 10A to 10C illustrate a monolithic capacitor according to a seventh preferred embodiment of the present invention, and specifically.
Figure 10B:
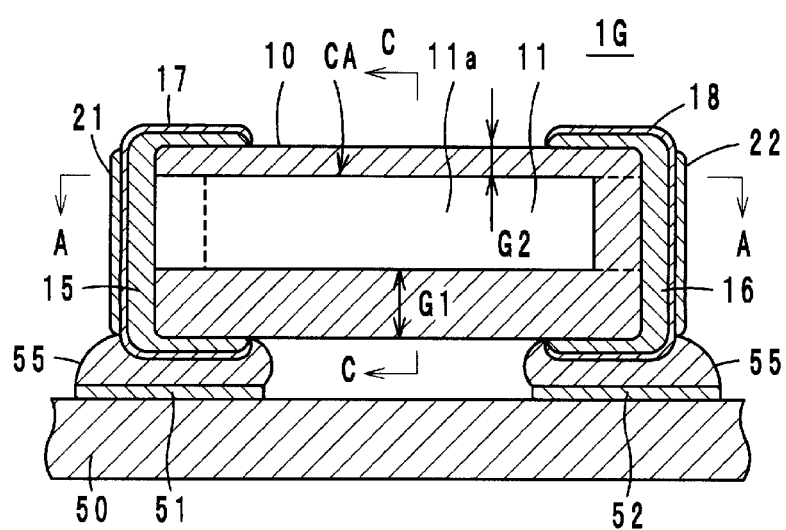
Figure 10C:
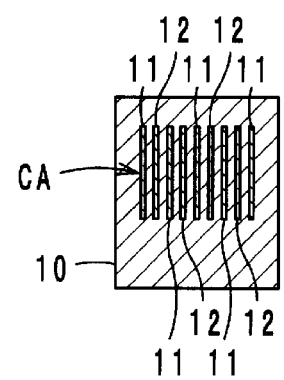

FIGS. 10A to 10C illustrate a monolithic capacitor 1G according to a seventh preferred embodiment of the present invention. As illustrated, the first capacitor electrodes 11 preferably extend outward to the fifth surface of the laminated body 10 to connect to the first outer electrode 15, and the second capacitor electrodes 12 extend outward to the sixth surface of the laminated body 10 to connect to the second outer electrode 16. The first outer electrode 15 is preferably arranged on the fifth surface and extends to both the first surface and the second surface, and the second outer electrode 16 is preferably arranged on the sixth surface and extends to both the first surface and the second surface. The plating layers 17 and 18 are disposed on the surfaces of the first and second outer electrodes 15 and 16, respectively. As illustrated in FIG. 10B, the monolithic capacitor 1G is preferably mounted by being connected to the lands 51 and 52 on the printed circuit board 50 such that solder fillets are defined on the fifth surface and the sixth surface. The monolithic capacitor 1G may alternatively be mounted in a filletless manner if so desired, that is, only the first surface side of the monolithic capacitor 1G may be connected to the lands 51 and 52 on the printed circuit board 50, with the solder 55 interposed therebetween.

In the seventh preferred embodiment, the surfaces of the first and second outer electrodes 15 and 16 are provided with first and second protective films 21 and 22, respectively, with the corresponding plating layers 17 and 18 interposed therebetween. The first and second protective films 21 and 22 are arranged to regulate wetting of the solder 55. The first and second protective films 21 and 22 are provided in at least respective central portions of the surfaces of the first and second outer electrodes 15 and 16, and are not provided on the first surface side (mounting surface side) and the second surface side of the first and second outer electrodes 15 and 16. Thus, since the first and second outer electrodes 15 and 16 are partially exposed to the outside on the first surface, the solder connection to the lands 51 and 52 is not blocked.

Resin resist films, for example, may be preferably used as the protective films 21 and 22. Resin resist films can be easily applied or stuck to the plating layers 17 and 18. Instead of resin resist films, metal oxide films or glass films may alternatively be used as the protective films 21 and 22 if so desired. Metal oxide films can be defined by irradiating metal films with laser light. When glass films are used, the plating layers 17 and 18 on thick films may be partially peeled off to allow exposure of the thick films. A thick film refers to a film defined by baking a conductive paste containing a glass component. By baking a conductive paste containing a glass component, a glass film is formed on the outer surface of the thick film. The plating layers 17 and 18 may be arranged on the exposed surfaces of the first and second outer electrodes 15 and 16, respectively, after the first and second protective films 21 and 22 are defined.

The monolithic capacitor 1G also preferably includes the gap dimension G1 greater than the gap dimension G2, and the resulting effect is the same as that described in the first preferred embodiment. Particularly in the seventh preferred embodiment of the present invention, where wetting of the solder 55 is regulated by the protective films 21 and 22, the formation of fillets can be limited to lower portions and the acoustic noise of the printed circuit board 50 can preferably be further reduced.

It is preferable that a dimension of a region of the first outer electrode 15 exposed from the first protective film 21 in the height direction along the fifth surface and a dimension of a region of the second outer electrode 16 exposed from the second protective film 22 in the height direction along the sixth surface be smaller than the gap dimension G1 between the first surface and the capacitive portions 11a and 12a. In this case, as viewed from the fifth surface and the sixth surface, the fillets do not reach the capacitive region CA where the laminated body 10 significantly expands or contracts in response to application of a voltage. Thus, since the transmission of vibration to the printed circuit board 50 is reduced, the acoustic noise of the printed circuit board 50 can be further reduced.

The protective films 21 and 22 may be provided on the surfaces of the first and second outer electrodes 15 and 16, respectively, arranged on the third or fourth surface of the laminated body 10. For example, the first protective film 21 may extend from the third surface through the fifth surface to the fourth surface and further extend in a belt-shaped arrangement along the first surface, and the second protective film 22 may extend from the third surface through the sixth surface to the fourth surface and further extend in a belt-shaped arrangement along the first surface. In this case, the first and second protective films 21 and 22 can reduce wetting of the solder 55 to the first and second outer electrodes 15 and 16 arranged on the third surface and the fourth surface, so that the acoustic noise can be further reduced.

The protective films 21 and 22 may extend from the third surface, through the fifth surface and the fourth surface, to the sixth surface to surround the monolithic capacitor in a belt-shaped arrangement. That is, the protective films 21 and 22 may be defined, not only on the surfaces of the first and second outer electrodes 15 and 16, but also on the surfaces of the laminated body 10 exposed on the third surface and the fourth surface. In this case, since the protective films 21 and 22 are arranged on the third surface and the fourth surface to surround the monolithic capacitor, it is possible to reduce peeling of the protective films 21 and 22 and reliably reduce the acoustic noise.

Figure 11:
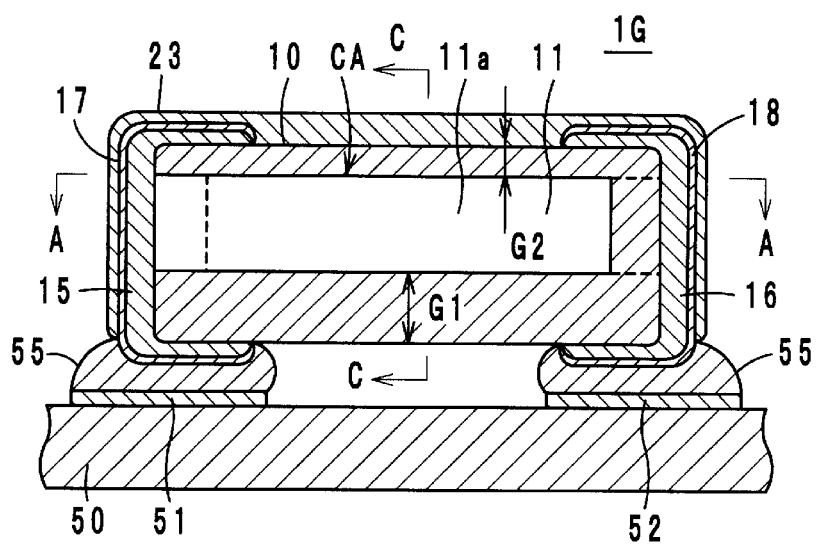
FIG. 11 is a cross-sectional view illustrating a mounted state of a modified monolithic capacitor of the seventh preferred embodiment of the present invention.

In the seventh preferred embodiment of the present invention, the protective films 21 and 22 may be modified to extend over the entire surfaces of the outer electrodes 15 and 16 on the fifth surface side and the sixth surface side, respectively, and may even extend over the entire second surface of the laminated body 10. Such a modification is illustrated in FIG. 11. In this modification, a protective film 23 preferably extends continuously over the entire fifth, second, and sixth surfaces of the laminated body 10.

Figure 12A:
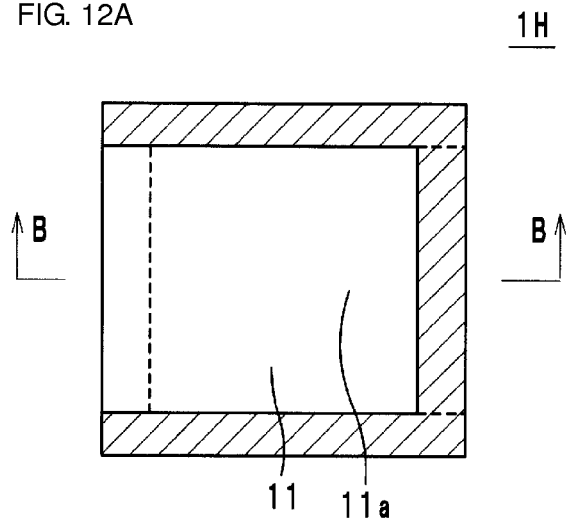
FIGS. 12A to 12C illustrate a monolithic capacitor according to an eighth preferred embodiment of the present invention, and specifically.
Figure 12B:
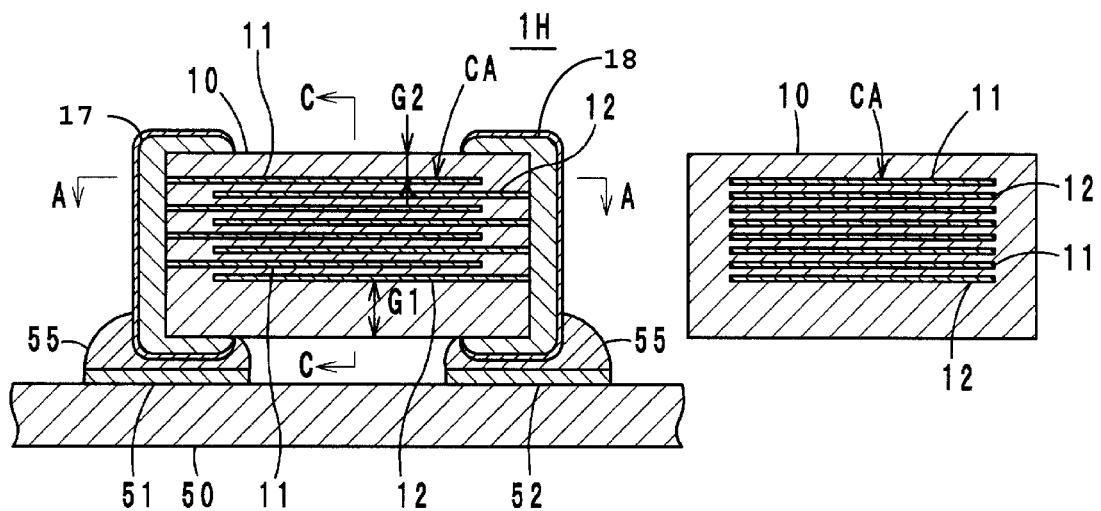
Figure 12C:
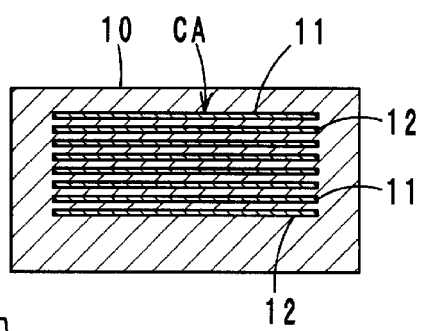

FIGS. 12A to 12C illustrate a monolithic capacitor 1H according to an eighth preferred embodiment. As illustrated, the first and second capacitor electrodes 11 and 12 are horizontal to the first surface and the second surface of the laminated body 10. The first capacitor electrodes 11 extend outward to the fifth surface of the laminated body 10 to connect to the first outer electrode 15, and the second capacitor electrodes 12 extend outward to the sixth surface of the laminated body 10 to connect to the second outer electrode 16. The first outer electrode 15 is arranged on the fifth surface and extends to both the first surface and the second surface, and the second outer electrode 16 is arranged on the sixth surface and extends to both the first surface and the second surface. The plating layers 17 and 18 are preferably disposed on the surfaces of the first and second outer electrodes 15 and 16, respectively.

Twenty-eight types of monolithic capacitors H (samples 13 to 40) structured as described above were prepared in the sizes shown in Table 2. Each of samples 13 to 40 was placed in the anechoic box 73 (see FIG. 13), and three alternating voltages having different frequencies of about 0.5 kHz, about 2.9 kHz, and about 4.8 kHz were applied to the sample (monolithic capacitor 1H). Then, the resulting acoustic noise was collected by the sound collecting microphone 74, and the sound pressure level of the collected sound was measured by the sound level meter 76 and the FFT analyzer 78 (which is preferably a CF-5220 by Ono Sokki Co., Ltd.). The test result is shown in Table 2.

dimension G1 depending on the frequency of alternating voltage to be applied. That is, if the ratio L/W is about 1.1 or less, the design of the gap dimension G1 can be simplified. The closer the ratio L/W is to 1.0, the more possible it is that the same gap dimension G1 can realize the lowest sound pressure level regardless of the frequency of the alternating voltage.

Because of the dimensional symmetry, the same applies to the case where the ratio L/W is about 1.0 or less. That is, if the ratio L/W is about 0.9 or more, the design of the gap dimension G1 can be simplified. The closer the ratio L/W is to 1.0, the more possible it is that the same gap dimension

TABLE 2

|  | Dimension L (mm) | Dimension W (mm) | Dimension T (mm) | L/W | Fillet Height X (mm) | Gap Dimension G1 (μm) | Gap Dimension G2 (μm) | Sound Pressure (AC Voltage 0.5 kHz) (dB) | Sound Pressure (AC Voltage 2.9 kHz) (dB) | Sound Pressure (AC Voltage 4.8 kHz) (dB) |
| --- | --- | --- | --- | --- | --- | --- | --- | --- | --- | --- |
| Sample 13 | 1.7 | 0.95 | 0.9 | 1.8 | 0.135 | 56 | 56 | 38.8 | 70.5 | 62.5 |
| Sample 14 |  |  |  | 1.8 | 0.135 | 150 | 56 | 32.4 | 62.6 | 56.3 |
| Sample 15 |  |  |  | 1.8 | 0.135 | 200 | 56 | 27.2 | 55.5 | 61.9 |
| Sample 16 |  |  |  | 1.8 | 0.135 | 250 | 56 | 18.8 | 33.9 | 63.8 |
| Sample 17 |  |  |  | 1.8 | 0.135 | 300 | 56 | 7.0 | 51.2 | 64.7 |
| Sample 18 |  |  |  | 1.8 | 0.135 | 350 | 56 | 21.0 | 56.7 | 65.2 |
| Sample 19 |  |  |  | 1.8 | 0.135 | 400 | 56 | 24.8 | 58.8 | 65.0 |
| Sample 20 | 1.7 | 1.55 | 0.9 | 1.10 | 0.135 | 56 | 56 | 44.3 | 76.8 | 80.7 |
| Sample 21 |  |  |  | 1.10 | 0.135 | 150 | 56 | 37.5 | 69.5 | 73.2 |
| Sample 22 |  |  |  | 1.10 | 0.135 | 200 | 56 | 32.4 | 63.9 | 66.7 |
| Sample 23 |  |  |  | 1.10 | 0.135 | 250 | 56 | 22.9 | 52.8 | 49.5 |
| Sample 24 |  |  |  | 1.10 | 0.135 | 300 | 56 | 17.1 | 52.6 | 61.1 |
| Sample 25 |  |  |  | 1.10 | 0.135 | 350 | 56 | 27.0 | 60.2 | 67.0 |
| Sample 26 |  |  |  | 1.10 | 0.135 | 400 | 56 | 30.3 | 63.4 | 69.4 |
| Sample 27 | 1.7 | 1.6 | 0.9 | 1.06 | 0.135 | 56 | 56 | 44.7 | 77.2 | 81.2 |
| Sample 28 |  |  |  | 1.06 | 0.135 | 150 | 56 | 37.7 | 69.9 | 73.8 |
| Sample 29 |  |  |  | 1.06 | 0.135 | 200 | 56 | 32.2 | 64.0 | 67.5 |
| Sample 30 |  |  |  | 1.06 | 0.135 | 250 | 56 | 22.6 | 53.0 | 53.8 |
| Sample 31 |  |  |  | 1.06 | 0.135 | 300 | 56 | 15.3 | 51.2 | 59.9 |
| Sample 32 |  |  |  | 1.06 | 0.135 | 350 | 56 | 27.4 | 60.5 | 66.6 |
| Sample 33 |  |  |  | 1.06 | 0.135 | 400 | 56 | 30.6 | 63.4 | 69.7 |
| Sample 34 | 1.7 | 1.7 | 0.9 | 1 | 0.135 | 56 | 56 | 45.3 | 77.9 | 82.8 |
| Sample 35 |  |  |  | 1 | 0.135 | 150 | 56 | 38.2 | 70.6 | 76.1 |
| Sample 36 |  |  |  | 1 | 0.135 | 200 | 56 | 33.1 | 65.4 | 71.6 |
| Sample 37 |  |  |  | 1 | 0.135 | 250 | 56 | 23.2 | 55.2 | 64.2 |
| Sample 38 |  |  |  | 1 | 0.135 | 300 | 56 | 16.2 | 49.0 | 44.3 |
| Sample 39 |  |  |  | 1 | 0.135 | 350 | 56 | 26.7 | 59.0 | 63.2 |
| Sample 40 |  |  |  | 1 | 0.135 | 400 | 56 | 31.2 | 63.2 | 67.9 |

As in the case of the first preferred embodiment, the acoustic noise was reduced when the gap dimension G1 was greater than the gap dimension G2 in samples 13 to 40. However, in samples 13 to 19 where the ratio between the length dimension L and the width dimension W (L/W) is about 1.8, the gap dimension G1 that realized the lowest sound pressure level varied depending on the frequency of the alternating voltage. On the other hand, in samples 20 to 33 where the ratio L/W is either about 1.10 or about 1.06, the range between the gap dimension G1 that realized the lowest sound pressure level and the gap dimension G1 that realized the second lowest sound pressure level was the same regardless of the frequency of the alternating voltage. In samples 34 to 40 where the ratio L/W was about 1.0, the gap dimension G1 that realized the lowest sound pressure level was the same regardless of the frequency of the alternating voltage.

This means that if the ratio between the length dimension L and the width dimension W (L/W) is greater than about 1.1, it may be necessary to change the design of the gap dimension G1 depending on the frequency of alternating voltage to be applied. However, if the ratio L/W is about 1.1 or less, there is no need to change the design of the gap G1 can realize the lowest sound pressure level regardless of the frequency of the alternating voltage.

A monolithic capacitor according to the present invention is not limited to the preferred embodiments described above, and can be variously changed within the scope of the present invention.

In particular, the detailed shapes of the laminated body and the capacitor electrodes may be freely determined. Although the capacitor may have any capacitance, capacitors having a capacitance of about 1 μF or more are generally known to cause acoustic noise.

As described above, the preferred embodiments of the present invention and modifications thereof are useful when applied to monolithic capacitors, and it is particularly advantageous in that it can reduce acoustic noise while providing a high degree of freedom in circuit design.

While preferred embodiments of the present invention and modifications thereof have been described above, it is to be understood that additional variations and modifications will be apparent to those skilled in the art without departing from the scope and spirit of the present invention. The scope of the present invention, therefore, is to be determined solely by the following claims.

What is claimed is:

1. A monolithic capacitor comprising:
a laminated body including a plurality of dielectric layers and being in or substantially in a shape of a rectangular parallelepiped including six surfaces, the laminated body including a first surface defining a mounting surface, a second surface opposite to the first surface, a third surface and a fourth surface orthogonal or substantially orthogonal to the first surface and the second surface and opposite to each other, and a fifth surface and a sixth surface orthogonal or substantially orthogonal to each of the first surface through the fourth surface and opposite to each other;
a plurality of capacitor electrodes disposed in the laminated body, the capacitor electrodes each including a capacitive portion and a lead portion extending outward from the capacitive portion to at least one of the surfaces of the laminated body, the capacitive portions facing each other with each of the dielectric layers interposed between adjacent ones of the capacitive portions; and
a first outer electrode and a second outer electrode disposed on at least one of the surfaces of the laminated body and connected to the lead portions, wherein
an inequality G1>G2 is satisfied, where G1 is a gap dimension between the first surface and the capacitive portions and G2 is a gap dimension between the second surface and the capacitive portions;
G1−G2 is at least about 10 μm;
the first outer electrode extends from the first surface to the fifth surface, and the second outer electrode extends from the first surface to the sixth surface; and
a height dimension of the first outer electrode along the fifth surface and a height dimension of the second outer electrode along the sixth surface are smaller than the gap dimension G1 between the first surface and the capacitive portions.

2. The monolithic capacitor according to claim 1, wherein an inequality T>W is satisfied, where T is a dimension between the first surface and the second surface and W is a dimension between the third surface and the fourth surface.

3. The monolithic capacitor according to claim 1, wherein the capacitor electrodes are perpendicular or substantially perpendicular to the first surface and the second surface.

4. The monolithic capacitor according to claim 3, wherein the dielectric layers and the capacitor electrodes are stacked in a direction between the third surface and the fourth surface.

5. The monolithic capacitor according to claim 3, wherein when a direction between the first surface and the second surface is defined as a height direction, a dimension of the capacitive portion of a capacitor electrode connected to the first outer electrode in the height direction is greater than a dimension of the capacitive portion of a capacitor electrode connected to the second outer electrode in the height direction.

6. The monolithic capacitor according to claim 5, wherein as viewed from the third surface, a region where the capacitive portion of the capacitor electrode connected to the first outer electrode does not overlap with the capacitive portion of the capacitor electrode connected to the second outer electrode is located at least on a side adjacent to the first surface.

7. The monolithic capacitor according to claim 1, wherein
at least a central portion of a surface of the first outer electrode on the fifth surface is provided with a first protective film that regulates solder wetting, and at least a central portion of a surface of the second outer electrode on the sixth surface is provided with a second protective film that regulates solder wetting; and
at least a portion of the first outer electrode and at least a portion of the second outer electrode are exposed to outside on the first surface.

8. The monolithic capacitor according to claim 1, wherein the capacitor electrodes are horizontal to the first surface and the second surface.

9. The monolithic capacitor according to claim 8, wherein an inequality $0.9 \leq L/W \leq 1.1$ is satisfied, where W is a dimension between the third surface and the fourth surface and L is a dimension between the fifth surface and the sixth surface.

10. The monolithic capacitor according to claim 1, wherein the first outer electrode is defined on the first surface and a lower portion of the fifth surface, and the second outer electrode is defined on the first surface and a lower portion of the sixth surface of the laminated body.

11. The monolithic capacitor according to claim 1, wherein the monolithic capacitor is mounted on a circuit board with solder interposed between the first and second outer electrodes and lands defined on the circuit board.

12. The monolithic capacitor according to claim 11, wherein the first outer electrode is defined on the first surface and a lower portion of the fifth surface, and the second outer electrode is defined on the first surface and a lower portion of the sixth surface of the laminated body.

13. The monolithic capacitor according to claim 11, wherein the solder contacts portions of the first outer electrode defined on the first surface and the lower portion of the fifth surface, and the solder contacts portions of the second outer electrode defined on the first surface and the lower portion of the sixth surface.

* * * * *